June 9, 1931.　　　D. E. GAMBLE　　　1,808,980
BEARING FOR CLUTCH RELEASES
Filed May 15, 1926
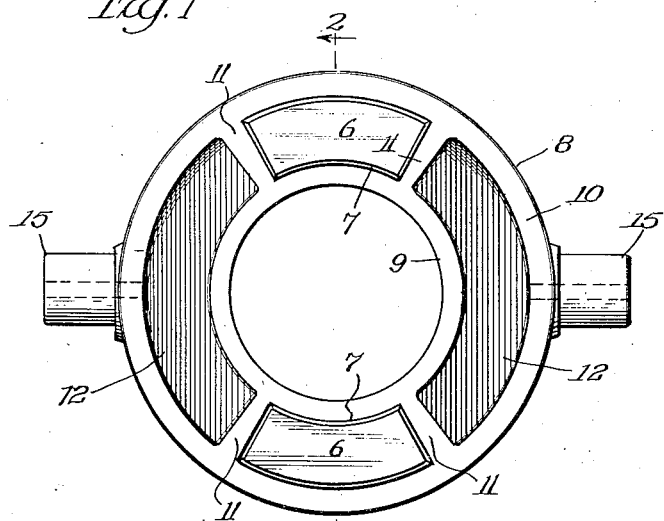
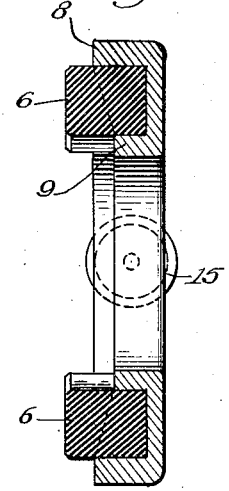
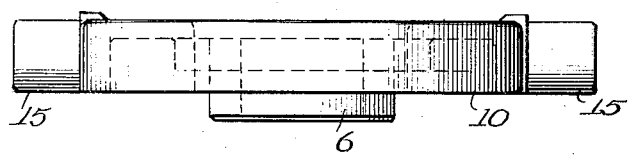
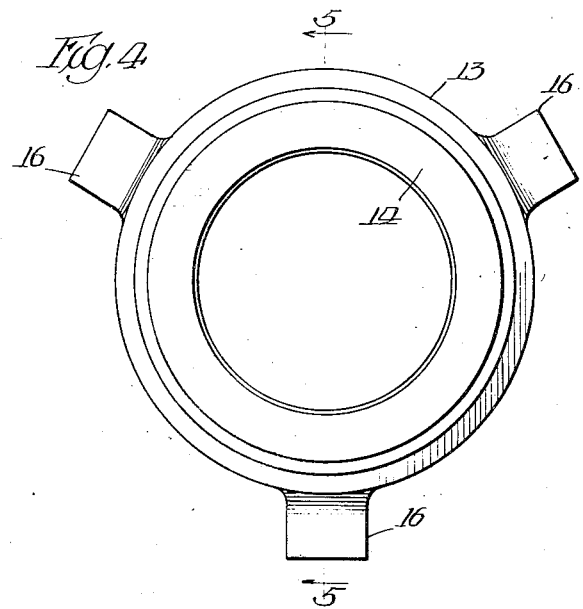
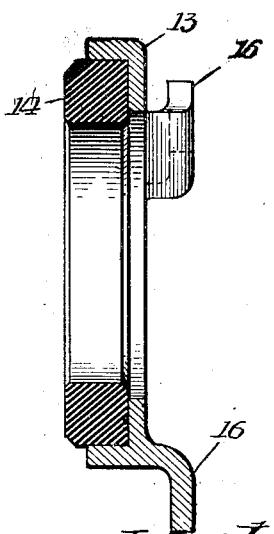

Patented June 9, 1931

1,808,980

UNITED STATES PATENT OFFICE

DAVID E. GAMBLE, OF DETROIT, MICHIGAN, ASSIGNOR TO THE BORG & BECK COMPANY, OF CHICAGO, ILLINOIS, A CORPORATION OF ILLINOIS

BEARING FOR CLUTCH RELEASES

Application filed May 15, 1926. Serial No. 109,238.

The object of this invention is to provide a novel and improved bearing for the release yoke of an automotive clutch.

A further object of the invention is to improve the manufacture of clutch release yoke bearings and reduce the cost thereof by casting the bearing cup upon the bearing antifriction material, whereby the necessity for machine work to fit the cup and the antifriction material and for locking the parts together is avoided.

The invention has other objects in view which will appear hereafter in the detail description reference being made to the accompanying drawings in which:

Fig. 1 is a plan view of a bearing embodying the invention with two spaced blocks of antifriction material.

Fig. 2 is a sectional view on the line 2—2 of Fig. 1.

Fig. 3 is an elevation of the bearing shown in Fig. 1.

Fig. 4 is a plan view of another type of bearing having a ring of antifriction material.

Fig. 5 is a sectional view on the line 5—5 of Fig. 4.

Referring to Figs. 1–3, 6, 6 are blocks of antifriction material which are conveniently disposed diametrically opposite and are seated in pockets 7, 7 in the cup 8. This cup is channel shaped and is provided with an inner flange 9 and an outer flange 10 and the antifriction blocks 6 are seated between these two flanges and between end partitions 11 which extend radially of the cup from flange 9 to flange 10. Thus the blocks are wholly enclosed within the pockets 7 and the ends of the blocks abut the partitions 11 which provide end stops to resist tendency of the blocks to move endwise in the cup under the influence of the clutch release sleeve, not shown, with which the bearing engages. The pockets 12, 12 between the blocks 6, 6 are empty, but they may be supplied with antifriction blocks, if desired.

In Figs. 4 and 5 I have shown an angle cup 13 without partitions and provided with a continuous ring bearing block 14.

The invention can be embodied in bearings of different kinds and in Figs. 1–3 I have shown the cup provided with trunnions 15 whereas in Figs. 4–5 I have shown the cup provided with fingers 16.

In the manufacture of the bearings the block or blocks are made first in a desired size and shape and then the cup is cast on the block. This is a simple and economical method of manufacture and it presents other advantages which are important in the art. By casting the cup on the bearing block I save the time and labor in machine work which would have to be performed on the cup to receive the bearing block; I also reduce the number of parts by dispensing with former cup construction including ears on the cup, a bolt engaging the ears and a lock washer, and lessen the cost. Furthermore, by casting the cup on the bearing block or blocks I provide a neat seat for the block or blocks in the cup and, as before stated, this is accomplished without the necessity for any machine work. I may provide the cup of Fig. 1, with fingers 16 or I may provide the cup of Fig. 4 with trunnions 15. I prefer to divide the bearing material into sections which are spaced apart, as shown in Fig. 1, because it is easier to cast a cup on these sections or blocks than on a continuous ring such as 14, and also because I find it possible to reduce the amount of bearing material to obtain a desired result. But for some purposes it may be desirable to have a continuous surface of bearing material, or for other reasons to have a continuous ring of bearing material, and in such case I make the ring as shown in Fig. 4.

I have shown my invention embodied in simple forms in the drawings, and I appreciate that changes in the form, construction and arrangement of parts as shown therein may be made without departing from the spirit or sacrificing the advantages of the invention, and I reserve the right to make all such changes as fall within the scope of the following claims:

I claim:

1. A clutch release yoke bearing comprising an antifriction bearing block and a cup cast on said block, the bearing portion of said block projecting beyond the face of the cup, and said cup having integral and radially disposed supporting members projecting outwardly from the periphery and at the back thereof.

2. A clutch release yoke bearing comprising a cup having antifriction bearing means therein, said bearing means projecting from one face of the cup, and fingers projecting from the periphery of the cup at right angles to the other face thereof, said fingers including portions projecting outwardly of the periphery of the cup and in a plane parallel with said other face thereof.

DAVID E. GAMBLE.